(12) United States Patent
Loehr et al.

(10) Patent No.: US 11,956,800 B2
(45) Date of Patent: *Apr. 9, 2024

(54) PREEMPTING AN ALLOCATION OF UPLINK RESOURCES

(71) Applicant: Lenovo (Singapore) PTE. LTD., New Tech Park (SG)

(72) Inventors: Joachim Loehr, Wiesbaden (DE); Alexander Johann Maria Golitschek Edler von Elbwart, Darmstadt (DE); Ravi Kuchibhotla, Chicago, IL (US); Prateek Basu Mallick, Dreieich (DE)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,226

(22) Filed: Apr. 11, 2022

(65) Prior Publication Data

US 2022/0240300 A1 Jul. 28, 2022

Related U.S. Application Data

(63) Continuation of application No. 16/670,919, filed on Oct. 31, 2019, now Pat. No. 11,304,223.

(Continued)

(51) Int. Cl.
*H04W 72/00* (2023.01)
*H04L 1/1812* (2023.01)
(Continued)

(52) U.S. Cl.
CPC ........... *H04W 72/23* (2023.01); *H04L 1/1812* (2013.01); *H04L 5/0048* (2013.01); *H04W 72/569* (2023.01)

(58) Field of Classification Search
CPC .............................. H04W 72/23; H04L 5/0048
See application file for complete search history.

(56) References Cited

U.S. PATENT DOCUMENTS

2011/0261814 A1* 10/2011 Matthews ............... H04L 47/28 370/389
2012/0026949 A1 2/2012 Kotecha
(Continued)

FOREIGN PATENT DOCUMENTS

WO 2016060809 A1 4/2016
WO 2017196160 A1 11/2017

OTHER PUBLICATIONS

3GPP, "3rd Generation Partnership Project; Technical Specification Group Radio Access Network; NR; Physical layer procedures for data (Release 15)", 3GPP TS 38.214 V15.3.0, Sep. 2018, pp. 1-96.
(Continued)

*Primary Examiner* — Barry W Taylor
(74) *Attorney, Agent, or Firm* — Kunzler Bean & Adamson

(57) ABSTRACT

Apparatuses, methods, and systems are disclosed for preempting an uplink resource allocation. One apparatus includes a processor and a transceiver that receives a first allocation of uplink resources in a mobile communication network and receives a second allocation of uplink resources. Here, the second allocation at least partially overlaps in time with the first allocation and the second allocation is received at a later time than the first allocation. The processor determines whether the second allocation is associated with higher priority traffic than the first allocation and preempts the first allocation to generate a TB according to the second allocation in response to the second allocation being associated with higher priority traffic than the first allocation.

20 Claims, 8 Drawing Sheets

Related U.S. Application Data

(60) Provisional application No. 62/753,824, filed on Oct. 31, 2018.

(51) Int. Cl.
  H04L 5/00 (2006.01)
  H04W 72/23 (2023.01)
  H04W 72/566 (2023.01)

(56) References Cited

U.S. PATENT DOCUMENTS

| | | | |
|---|---|---|---|
| 2017/0013565 A1* | 1/2017 | Pelletier | H04W 52/367 |
| 2018/0192434 A1 | 7/2018 | Lee | |
| 2019/0059013 A1 | 2/2019 | Rahman et al. | |
| 2019/0098612 A1 | 3/2019 | Babaei et al. | |
| 2019/0166625 A1* | 5/2019 | Nam | H04L 1/0058 |
| 2019/0215781 A1* | 7/2019 | Jeon | H04W 52/325 |
| 2019/0306923 A1* | 10/2019 | Xiong | H04J 13/0062 |
| 2020/0053820 A1 | 2/2020 | Chin et al. | |
| 2020/0067649 A1 | 2/2020 | Kim et al. | |
| 2020/0077438 A1 | 3/2020 | Kim et al. | |
| 2020/0195386 A1 | 6/2020 | Marinier et al. | |
| 2020/0274654 A1 | 8/2020 | Loehr et al. | |

OTHER PUBLICATIONS

Vivo, "Discussion on handling UL multiplexing of transmissions with different reliability requirements", 3GPP TSG RAN WG1 Meeting #92bis R1-1803848, Apr. 16-20, 2018, pp. 1-10.

Catt, "Discussion on intra-UE multiplexing scenarios", 3GPP TSG RAN WG1 Ad-Hoc Meeting 1901 R1-1900337, Jan. 21-25, 2019, pp. 1-9.

Ericsson, "Intra-UE prioritization", 3GPP TSG-RAN WG2 #103bis Tdoc R2-1814812, Oct. 8-12, 2018, pp. 1-3.

Lenovo, Motorola Mobility, "Intra-UE prioritization UL Data/ Data", 3GPP TSG-RAN WG2 Meeting #105 R2-1901199, Feb. 25-Mar. 1, 2019, pp. 1-3.

Ecrisson, "On intra-UE prioritization enablers", 3GPP TSG RAN WG1 Meeting #96bis Tdoc R1-1904130, Apr. 8-Apr. 12, 2019, pp. 1-10.

Qualcomm Inc, "On the scope of intra-UE DL/UL multiplexing", 3GPP TSG-RAN WG2 Meeting #103bis R2-1815600, Oct. 8-12, 2018, pp. 1-3.

Ecrisson, "Physical Layer Enhancements for Intra-UE Prioritization and Multiplexing", 3GPP TSG RAN WG1 Meeting #96 Tdoc R1-1901601, Feb. 25-Mar. 1, 2019, pp. 1-6.

Sony, "UL Inter-UE Pre-emption", 3GPP TSG RAN WG1 Meeting #94 R1-1808344, Aug. 20-24, 2018, pp. 1-6.

Sony, Considerations on UL pre-emption, 3GPP TSG RAN WG1 Meeting #92bis R1-1804600, Apr. 16-20, 2018, pp. 1-8.

Intel Corporation, Handling UL transmissions with different reliability requirements, 3GPP TSG RAN WG1 Meeting #92bis R1-1804742, Apr. 16-20, 2018, pp. 1-8.

* cited by examiner

PREEMPTING AN ALLOCATION OF UPLINK RESOURCES

CROSS-REFERENCE TO RELATED APPLICATIONS

This application claims priority to U.S. patent application Ser. No. 16/670,919 entitled "PREEMPTING AN ALLOCATION OF UPLINK RESOURCES" and filed on Oct. 31, 2019 for Joachim Loehr, Alexander Johann Maria Golitschek Edler von Elbwart, Ravi Kuchibhotla, and Prateek Basu Mallick, which application is incorporated herein by reference. U.S. patent application Ser. No. 16/670,919 claims priority to U.S. Provisional Patent Application No. 62/753,824 entitled "EFFICIENT PROTOCOL OPERATION FOR UPLINK PREEMPTION" and filed on Oct. 31, 2018 for Joachim Loehr, Alexander Johann Maria Golitschek Edler von Elbwart, Ravi Kuchibhotla, and Prateek Basu Mallick, which application is incorporated herein by reference.

FIELD

The subject matter disclosed herein relates generally to wireless communications and more particularly relates to efficient protocol operation for uplink preemption.

BACKGROUND

The following abbreviations are herewith defined, at least some of which are referred to within the following description: Third Generation Partnership Project ("3GPP"), Fifth Generation Core Network ("5CG"), Access and Mobility Management Function ("AMF"), Positive-Acknowledgment ("ACK"), Access Stratum ("AS"), Base Station ("BS"), Control Element ("CE"), Channel State Information ("CSI"), Core Network ("CN"), Control Plane ("CP"), Downlink Control Information ("DCI"), Downlink ("DL"), Evolved Node-B ("eNB"), Evolved Packet Core ("EPC"), Global System for Mobile Communications ("GSM"), Hybrid Automatic Repeat Request ("HARQ"), Home Subscriber Server ("HSS"), Information Element ("IE"), Internet-of-Things ("IoT"), Long Term Evolution ("LTE"), Multiple Access ("MA"), Mobility Management Entity ("MIME"), Modulation Coding Scheme ("MCS"), Machine Type Communication ("MTC"), Negative-Acknowledgment ("NACK") or ("NAK"), New Generation (5G) Node-B ("gNB"), New Generation Radio Access Network ("NG-RAN", a RAN used for 5G networks), New Radio ("NR", a 5G radio access technology; also referred to as "5G NR"), Non-Access Stratum ("NAS"), Network Slice Selection Assistance Information ("NSSAI"), Packet Data Unit ("PDU", used in connection with 'PDU Session'), Physical Downlink Control Channel ("PDCCH"), Physical Downlink Shared Channel ("PDSCH"), Physical Random Access Channel ("PRACH"), Physical Resource Block ("PRB"), Physical Uplink Control Channel ("PUCCH"), Physical Uplink Shared Channel ("PUSCH"), Public Land Mobile Network ("PLMN"), Quality of Service ("QoS"), Radio Access Network ("RAN"), Radio Access Technology ("RAT"), Radio Bearer ("RB"), Radio Resource Control ("RRC"), Random-Access Channel ("RACH"), Random Access Response ("RAR"), Radio Network Temporary Identifier ("RNTI"), Reference Signal ("RS"), Registration Management ("RM", refers to NAS layer procedures and states), Receive ("RX"), Radio Link Control ("RLC"), Scheduling Request ("SR"), Shared Channel ("SCH"), Session Management Function ("SMF"), Sounding Reference Signal ("SRS"), Transport Block ("TB"), Transport Block Size ("TBS"), Transmit ("TX"), Unified Data Management ("UDM"), User Data Repository ("UDR"), Uplink Control Information ("UCI"), User Entity/Equipment (Mobile Terminal) ("UE"), Uplink ("UL"), User Plane ("UP"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In NR Rel-15 it is not possible to preempt a dynamic uplink grant allocation with another dynamic grant received via DCI, i.e., uplink preemption is not supported. In other words, within a single cell, "out-of-order" scheduling is not supported in Rel-15 for the case of two dynamic grants. Rather, once a DCI is received for a PUSCH transmission at a first time, a later received DCI should correspond to a PUSCH transmission at a later time. Moreover, for a resource conflict between configured grant resources and dynamic allocated resources, a UE according to the current specified NR Rel-15 behavior would always prioritize a dynamic grant over a configured grant. However, this may lead to problems where the UE would need to use grants which are not suitable for the transmission of critical/high urgency packets.

BRIEF SUMMARY

This disclosure provides an efficient protocol operation for the case of Intra-UE UL prioritization. For uplink, a UE may be scheduled with two dynamic uplink grants allocating overlapping PUSCH resources for data of different priority levels. For example, the gNB may schedule an urgent/critical URLLC PUSCH transmission, e.g., using a high reliable MCS for the transmission, to preempt a previously scheduled PUSCH transmission intended for lower priority eMBB data. Several embodiments of this disclosure are related to the detailed UE behavior for UL preemption.

The disclosure further contains embodiments providing solutions for cases when there is a conflict of allocated UL resources. For the uplink a UE may transmit data of high priority (e.g., URLLC) on resources allocated by a configured grant. In addition, the UE may be scheduled by dynamic UL grants e.g., for transmission of lower priority data such as eMBB which may lead to a UL resource conflict, i.e., UE has two allocated UL resources at the time of uplink transmission.

Further embodiments are related to the support of packets of different priority/urgency level within one radio bearer or QoS flow. For example, an Industrial IoT traffic flow may support critical packets, e.g., emergency stop packets, within a radio bearer or a QoS flow. Those critical packets are to be prioritized over other packets within the same radio bearer or the QoS flow.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
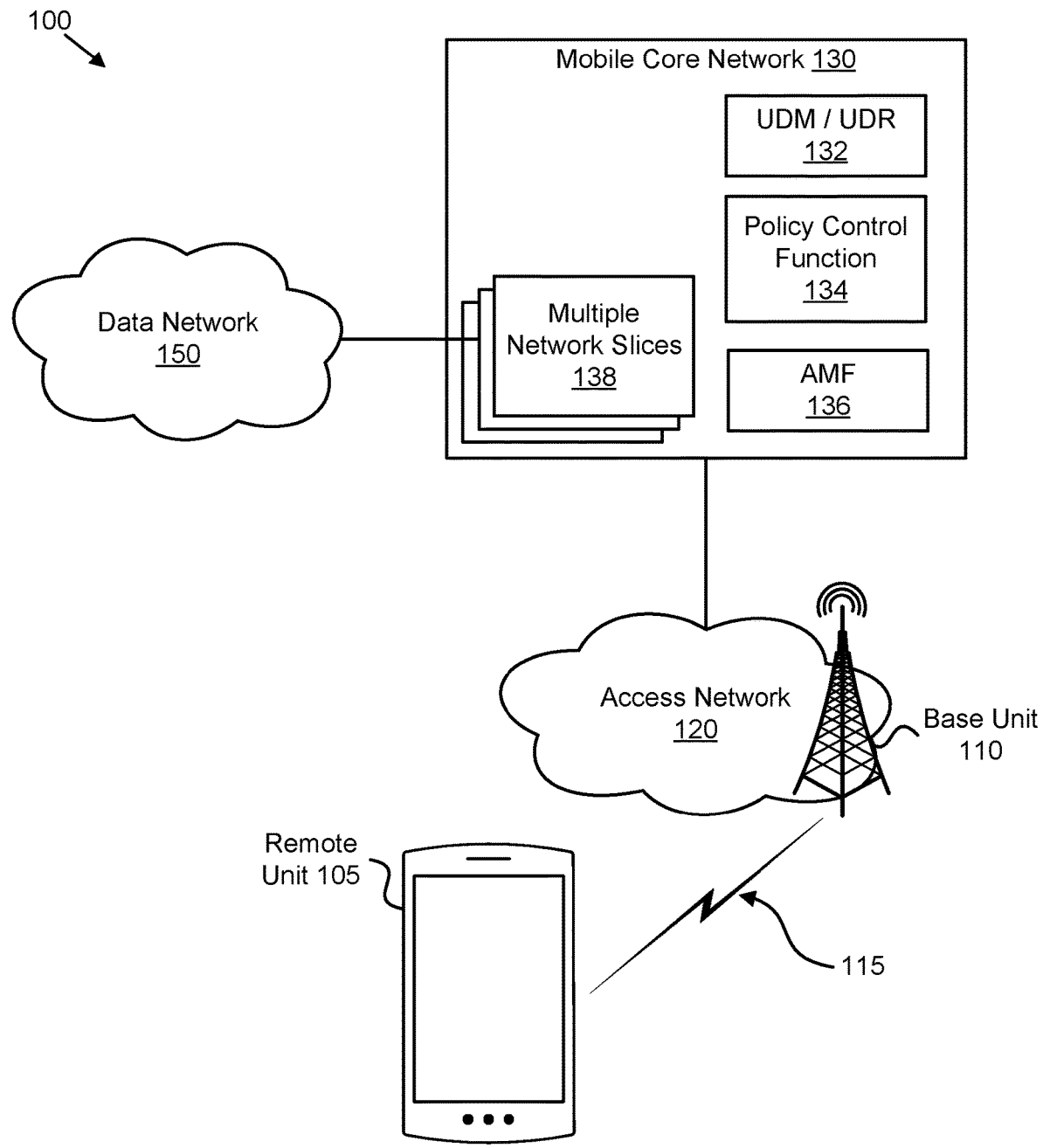
FIG. 1 is a schematic block diagram illustrating one embodiment of a wireless communication system for uplink preemption.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for efficient protocol operation for uplink preemption. This disclosure provides an efficient protocol operation for the case of Intra-UE UL prioritization. For uplink ("UL"), a UE may be scheduled with two dynamic uplink grants allocating overlapping PUSCH resources for data of different priority levels. For example, a gNB may schedule an urgent/critical URLLC PUSCH transmission, e.g., using a high reliable MCS for the transmission, to preempt a previously scheduled PUSCH transmission intended for lower priority eMBB data. Several embodiments of this disclosure are related to the detailed UE behavior for UL preemption.

The disclosure further contains embodiments providing solutions for cases when there is a conflict of allocated UL resources. For UL, a UE may transmit data of high priority (e.g., URLLC) on resources allocated by a configured grant. In addition, the UE may be scheduled by dynamic UL grants, e.g., for transmission of lower priority data such as eMBB, which may lead to a UL resource conflict, i.e., UE has two allocated UL resources at the time of uplink transmission. Recall that a UE according to the current specified NR Rel-15 behavior would always prioritize the dynamic grant (here, associated with the lower priority data) over the configured grant (here, associated with the higher priority data).

Further embodiments are related to the support of packets of different priority/urgency level within one radio bearer or QoS flow. For example, an Industrial IoT ("IIoT") traffic flow may support critical packets, e.g., emergency stop packets, within a radio bearer or a QoS flow. Those critical packets are to be prioritized over other packets within the same radio bearer or the QoS flow.

The first problem mentioned above, i.e., detailed UE/protocol behavior for UL preemption, has not been addressed by 3GPP. Recall that in NR Rel-15, it is not possible to preempt a dynamic uplink grant allocation with another dynamic DCI, i.e., uplink preemption is not supported. In other words, within a single cell, "out-of-order" scheduling is not supported in Rel-15 (at least for the case of two dynamic grants), that is, once a DCI is received for a PUSCH transmission, a later DCI is to correspond to a PUSCH transmission at a later time.

For the second problem mentioned above, i.e., resource conflict between configured grant resources and dynamic allocated resources, a UE according to the current specified NR Rel-15 behavior is to prioritize a dynamic grant over a configured grant. As noted above, this may lead to problems where the UE would need to use grants which are not suitable for the transmission of critical/high urgency packets. Also, the support of packets of different priority levels within the same radio bearer/QoS flow is not supported so far in the current specified NR Rel-15.

FIG. 1 depicts an embodiment of a wireless communication system 100 for efficient protocol operation for uplink preemption, according to various embodiments of the disclosure. In one embodiment, the wireless communication system 100 includes remote units 105, base units 110, and communication links 115. Even though a specific number of remote units 105, base units 110, and communication links 115 are depicted in FIG. 1, one of skill in the art will recognize that any number of remote units 105, base units 110, and communication links 115 may be included in the wireless communication system 100.

In one implementation, the wireless communication system 100 is compliant with the NR system specified in the 3GPP specifications and/or the LTE system specified in 3GPP. More generally, however, the wireless communication system 100 may implement some other open or proprietary communication network, for example, WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the base units 110 via uplink ("UL") and downlink ("DL") communication signals. Furthermore, the UL and DL communication signals may be carried over the communication links 115.

In some embodiments, a remote unit 105 may establish a data connection (e.g., a PDU session) with the data network 150 via the mobile core network 130. Here, the data path of a PDU session may be established over one of the multiple network slices 138 supported by the mobile core network 130. The specific network slice 138 used by the PDU session may be determined by the S-NSSAI attribute of the PDU session. Here, the remote unit 105 may be provisioned with Network Slice Selection Policy ("NSSP") rules which it uses to determine how to route a requested PDU session.

The base units 110 may be distributed over a geographic region. In certain embodiments, a base unit 110 may also be referred to as a RAN node, an access terminal, a base, a base station, a Node-B, an eNB, a gNB, a Home Node-B, a relay node, a femtocell, an access point, a device, or by any other terminology used in the art. The base units 110 are generally part of an access network 120, such as a radio access network ("RAN"), that may include one or more controllers communicably coupled to one or more corresponding base units 110. These and other elements of the access network 120 are not illustrated but are well known generally by those having ordinary skill in the art. The base units 110 connect to the mobile core network 130 via the access network 120. The access network 120 and mobile core network 130 may be collectively referred to herein as a "mobile network" or "mobile communication network."

The base units 110 may serve a number of remote units 105 within a serving area, for example, a cell or a cell sector via a wireless communication link. The base units 110 may communicate directly with one or more of the remote units 105 via communication signals. Generally, the base units 110 transmit downlink ("DL") communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 110.

In one embodiment, the mobile core network 130 is a 5G core network ("5GC"), which may be coupled to a data network 150, like the Internet and private data networks, among other data networks. In some embodiments, the remote units 105 communicate with an application function ("AF") 155 (external to the mobile core network 13) via a network connection with the mobile core network 130. Each mobile core network 130 belongs to a single public land mobile network ("PLMN"). The present disclosure is not intended to be limited to the implementation of any particular wireless communication system architecture or protocol. For example, other embodiments of the mobile core network 130 include an enhanced packet core ("EPC") or a Multi-Service Core as describe by the Broadband Forum ("BBF").

The mobile core network 130 includes several network functions ("NFs") and multiple network slices 138. As depicted, the mobile core network 130 includes at least one unified data management with an internal user data repository ("UDM/UDR") 132, at least one policy control function ("PCF") 134, at least one access and mobility management function ("AMF") 136, and at least one network exposure function ("NEF") 137. Although a specific number of NFs are depicted in FIG. 1, one of skill in the art will recognize that any number of NFs may be included in the mobile core network 130. In certain embodiments, each of the multiple network slices 138 includes its own dedicated network functions (not shown), such as a session management function ("SMF") and user plane function ("UPF"). While the depicted embodiment shows a single AMF in the mobile core network 130, in other embodiments each of the multiple network slices 138 may implement its own AMF.

The UDM/UDR 132 comprises a Unified Data Management ("UDM") and its internal component User Data Repository ("UDR"). The UDR holds subscription data including policy data. Specifically, the policy data stored by the UDM/UDR 132 includes the NSSP. The UDM/UDR 132, PCF 134, AMF 136, and SMF (not shown) are examples of control plane network functions of the mobile core network 130. Control plane network functions provide services such as UE registration, UE connection management, UE mobility management, session management, and the like. In contrast, a UPF provides data transport services to the remote units 105.

The multiple network slices 138 are logical networks within the mobile core network 130. The network slices 138 are partitions of resources and/or services of the mobile core network 130. Different network slices 138 may be used to meet different service needs (e.g., latency, reliability, and capacity). Examples of different types of network slices 138 include enhanced mobile broadband ("eMBB"), massive machine-type communication ("mMTC"), and ultra-reliability and low latency communications ("URLLC"). A mobile core network 130 may include multiple network slice instances of the same network slice type. Different network slice instance of the same type may be distinguished by a slice "tenant" (also known as "slice differentiator") associated with the instance.

In some embodiments, a remote unit 105 may be scheduled with two dynamic uplink grants allocating overlapping PUSCH resources for data of different priority levels. Here, the later received dynamic grant may allocate resources for higher priority traffic. Accordingly, the remote unit 105 acts on the uplink grants "out-of-order" by preempting the first received dynamic grant (associated with lower priority traffic) in order to process and fulfill the second received grant (associated with higher priority traffic).

In some embodiments, a remote unit 105 may receive a dynamic grant of PUSCH resources that conflicts (e.g., overlaps) with a previously configured grant. Here, the (previously) configured grant may be associated with higher priority traffic, while the later received dynamic grant may allocate resources for lower priority traffic. Although dynamic grants are typically prioritized over configured grants, here the remote unit 105 recognizes that the configured grant is associated with higher urgency traffic than the dynamic grant and thus preempts the dynamic grant (associated with lower priority traffic) in order to process and fulfill the configured grant (associated with higher priority traffic).

In some embodiments, a remote unit 105 may support different priority levels within the same radio bearer or QoS flow. Here, the remote unit 105 prioritizes the higher priority (e.g., more critical) data packets over other packets within the same radio bearer or QoS flow.

For uplink preemption, if a DCI which is preempted is for scheduling a retransmission, then the remote unit 105 follows the preemption DCI (e.g., associated with higher priority data) and also further processes the TB in accordance to the preempted grant, which TB may be stored in a HARQ transmission buffer for retransmission (similar treatment as for measuring gap). However, if the DCI which is preempted is for scheduling an initial transmission, then the remote unit 105 may ignore the preempted DCI and only follow the preemption DCI, e.g., no TB is generated for the preempted lower priority DCI. Note that if processing of the preempted DCI has already begun, then the remote unit may pause (e.g., interrupt) processing of the preempted (lower priority) DCI to follow the preemption (higher priority) DCI.

In some embodiments, the remote unit 105 may receive a DCI that explicitly indicates that it is a preempting grant. In one embodiment, a UL-SCH indicator in DCI 0-1 (e.g., a 1-bit field) may be used to indicate the preemption (e.g., that the DCI is associated with high urgency). In another embodiment, an SRS with invalid state is used to indicate a high urgency/preempting grant. In yet another embodiment, a specific RNTI may be used to indicate the preemption.

In case the remote unit 105 has some (dynamically) scheduled UL resources which are intended for low priority traffic like eMBB and then high urgency/reliable data arrives in the remote unit's buffer, the remote unit 105 may be allowed to use the scheduled resources for the transmission of high urgency/reliable data. In certain embodiments, the remote unit 105 uses a different MCS/TB size for the transmission of high urgency data than the scheduled MCS/TB size. Therefore, the remote unit 105 may also include some UCI (uplink control information) in the assigned resources which indicate the used MCS for gNB detection.

Here, UCI inclusion will be done at the PHY layer entity. Moreover, the UCI position may be fixed such that the base unit 110 is able to detect UCI based on CRC check. In certain embodiments, the UCI is positioned at the start of the PUSCH resource, e.g. after upfront DM-RS. In certain embodiments, the modulation scheme of UCI could be predefined or fixed (e.g., always QPSK). Additionally, the remote unit 105 may modify power control parameters. For example, the remote unit 105 may use some predefined power setting (Po, alpha) for the transmission of the high urgency data. Further, the remote unit 105 may determine whether it is allowed/can use the allocated UL resource for the transmission of the high urgency/reliable data. In one embodiment, the remote unit 105 may have one table where for different TB sizes the required number of allocated RBs are defined. In case the allocated RB size of the low priority grant supports the packet size of the high urgency data then the remote unit 105 is allowed to transmit the data on the allocated UL resources. In another embodiment, the remote unit 105 may use the modulation scheme given for the allocated UL resource and calculate the coding rate for the transmission of the high urgency data. In case the determined code rate is lower than a predefined threshold then the remote unit 105 transmits the data on the allocated UL resources.

For the case that the remote unit 105 has a configured grant and a dynamic scheduled resource and needs to transmit critical/high urgency data, the remote unit 105 determines which UL resources to use for the transmission of the critical data depending on certain defined criteria. For example, if the high urgency data packet size fits only in dynamic scheduled UL resources the remote unit 105 uses the dynamic scheduled UL resources. If the high urgency data packet size fits only in configured UL resources, then the remote unit 105 uses the configured UL resources. If the high urgency data packet size fits both in dynamic scheduled UL resources as well as in configured UL resources, then the remote unit 105 decides based on further criteria. If the high urgency data packet size fits neither in dynamic scheduled UL resources nor in configured UL resources, then the remote unit 105 sends some "high urgency BSR" together with eMBB (or other non-high-urgency) data on the dynamically allocated UL resources indicating the size of the high urgency data Moreover, protocol behavior for the case that packets of different priority is supported within one bearer/QoS flow may include the remote unit 105 having one PDCP entity mapped to several RLC entities/LCHs without duplication.

Figure 2:
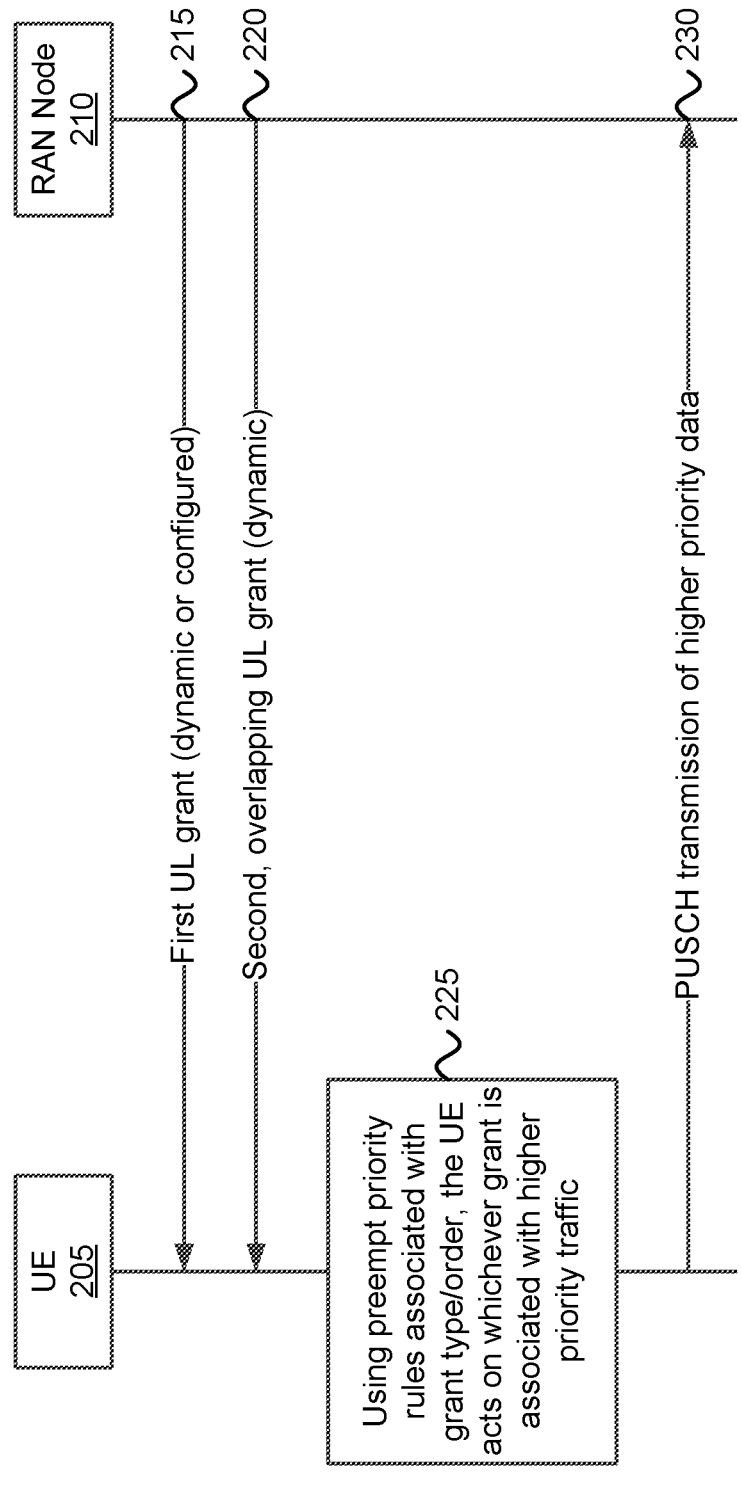
FIG. 2 is a diagram illustrating one embodiment a network procedure for uplink preemption.

FIG. 2 depicts a network procedure 200 for efficient uplink preemption, according to embodiments of the disclosure. The network procedure 200 involves a UE 205 and a RAN node 210. Here, the UE 205 may be one embodiment of the remote unit 105. Moreover, the RAN node 210 may be one embodiment of the base unit 110. Examples of a RAN node 210 include a gNB or other 5th generation base station.

The RAN node 210 sends a first UL grant 215 to the UE 205. At a later point in time, but prior to the UE 205 transmitting according to the first UL grant, the RAN node 210 sends a second (dynamic) UL grant 220 to the UE 205. In one embodiment, the first UL grant 215 is a configured grant (e.g., a semi-static grant) involving periodic UL resources. In another embodiment, the first UL grant 215 is a dynamic grant allocating UL resources. A configured grant differs from a dynamically scheduled grant in that the resources in a configured grant are periodic and semi-persistently scheduled. In certain embodiments, multiple devices may share the periodic resources. In contrast, a dynamic grant is a one-time grant of (aperiodic) resources. Typically, resources scheduled by dynamic grant are not shared among multiple devices.

In order to efficiently process UL transmissions, the UE 205 identifies traffic types associated with the "conflicting" UL grants (e.g., UL grants scheduled for the same transmission opportunity, e.g., same and or/overlapping frame, slot, TTI, etc.) and, if needed, preempts a higher priority grant type in order to act on the highest priority traffic type (see block 225).

For example, the first UL grant 215 may be a dynamic grant. As mentioned above, the UE 205 will typically act on the first received dynamic UL grant prior to acting on the second received dynamic UL grant. However, where the traffic type associated with the second received dynamic UL grant is of a higher priority than the traffic associated with the first received dynamic UL grant, the UE 205 will preempt the first received dynamic UL grant in order to act upon the second received dynamic UL grant.

In another example, the first UL grant 215 may be a configured (e.g., semi-persistent) grant. As mentioned above, the UE 205 will typically act on the dynamic UL grant prior to acting on the configured UL grant (e.g., a dynamic grant has priority over a configured grant). However, where the traffic type associated with the configured UL grant is of a higher priority than the traffic associated with the dynamic UL grant, the UE 205 will preempt the dynamic UL grant (e.g., the second UL grant) in order to act upon the configured UL grant.

As depicted, the UE 205 transmits to the RAN node 210 PUSCH 230 associated with the higher priority traffic type. In the first example above, the UE 205 transmits PUSCH 230 associated with the second received UL grant 220 because it is associated with higher priority traffic then the first received UL grant 215. In the second example above, the UE 205 transmits PUSCH 230 associated with the configured UL grant because it is associated with higher priority traffic in the dynamic UL grant.

Figure 3:
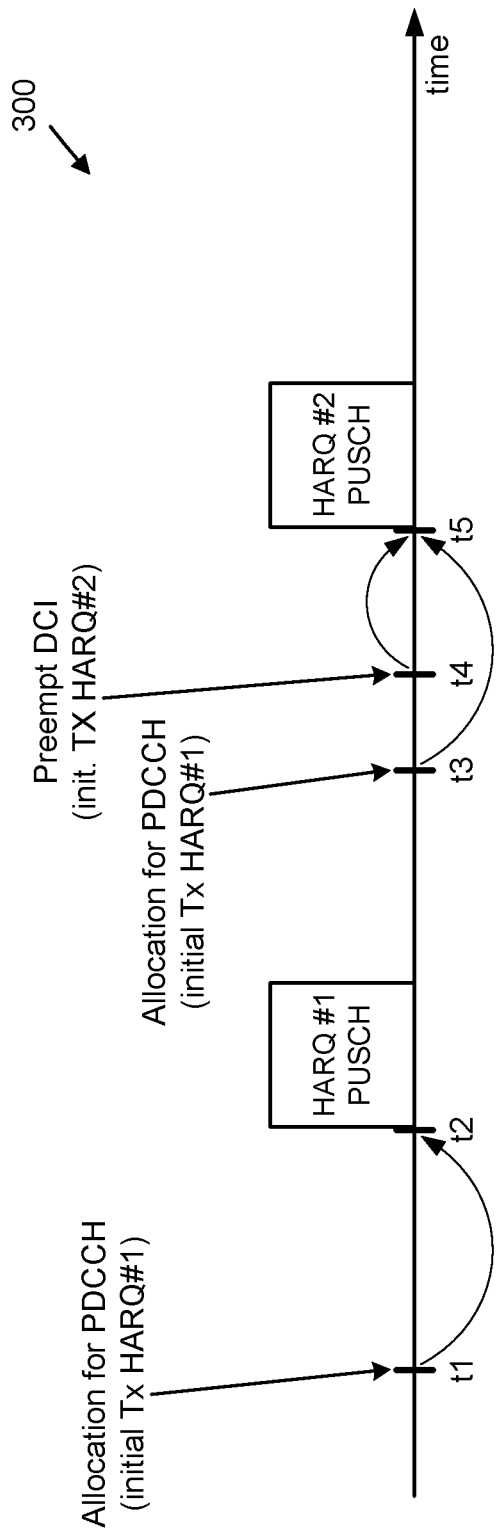
FIG. 3 is a diagram illustrating one embodiment of timing of uplink preemption.

FIG. 3 depicts a timing diagram for a UL preemption scenario 300, according to embodiments of the disclosure. The UL preemption scenario 300 may be implemented at a UE, such as the remote unit 105 and/or the UE 205. At time 't1', the UE receives an allocation of uplink resources (e.g., PUSCH resources) via PDCCH. In the embodiment of FIG. 3, it is assumed that the scheduled resources are for normal priority data and are associated with an initial transmission for a first HARQ process (HARQ #1). Here, the allocation of uplink resources may be a dynamic grant received via DCI. As depicted, the allocated uplink resources (PUSCH resources) begin at time 't2'. Accordingly, the UE sends data for HARQ #1 in the PUSCH transmission that begins at time 't2.'

At time 't3', the UE receives another allocation of uplink resources (e.g., PUSCH resources) via PDCCH. The second grant is also associated with an initial transmission for the first HARQ process (HARQ #1). Here, the allocation of uplink resources may be a dynamic grant received via DCI. As depicted, the allocated uplink resources (PUSCH resources) begin at time 't5'.

At time 't4' (e.g., after receiving the allocation of uplink resources, but before time 't5') the UE receives a preempting DCI allocating resources for high urgency (or critical) data which at least partially overlaps with the resource allocation scheduled by the grant received at time 't3'. In the embodiment of FIG. 3, the high urgency/critical data is associated with an initial transmission for a different HARQ process (e.g., HARQ #2). The DCI received at 't4' preempts the PUSCH transmission scheduled by DCI received in 't3,' therefore the UE transmits the high urgency/critical data in the PUSCH resources scheduled at 't5.'

According to a first solution for efficient uplink preemption, a UE is scheduled with two dynamic grants (DCI) allocating overlapping PUSCH resources, whereby the second dynamic grant which is received later than the first dynamic grant allocates UL resources for high urgency/ priority traffic. The second (later) DCI allocating PUSCH resources for high urgency data, according to this embodiment, takes priority over the PUSCH resources allocated by the first DCI, i.e., second DCI preempts the previously scheduled PUSCH transmission (by the first DCI). In one example gNB schedules a URLLC PUSCH transmission by means of a DCI to preempt a previously scheduled PUSCH transmission for eMBB traffic.

According to this first solution, a UE, e.g., the MAC entity of the UE, processes and acts according to the second (later) received DCI scheduling PUSCH resources for high urgency/priority/reliability traffic, which is also referred to as the "preempting grant" or "preempting DCI." For cases when the first received DCI, which is referred to as "preempted grant," is scheduling PUSCH resources for a retransmission, i.e., where the NDI is not toggled, the UE may also further execute/process the first received DCI in parallel. To be more specific, the MAC entity identifies the HARQ process associated with the preempting grant, generates a MAC PDU in accordance with the transport block size indicated in the grant (assuming that the preempting grant requests a new initial transmission), and stores the generated MAC PDU in the associated HARQ buffer. In addition, the MAC entity in the UE generates a retransmission of the TB stored in the HARQ process indicated in the preempted grant, i.e., MAC delivers the TB stored in the HARQ process (Tx buffer) to the physical layer.

Even though the physical layer may not perform the retransmission of the TB because the high urgency grant takes priority over the preempted retransmission grant (i.e., the physical layer performs transmission according to the preempting grant), from MAC layer/HARQ protocol point of view the (re)transmission takes place (this behavior is similar to the case of a PUSCH transmission colliding with a measurement gap). It should be noted that the assumption for the described behavior is, that the HARQ process indicated by the preempting grant is different than the HARQ process addressed by the preempted grant.

According to one implementation of the first solution, a UE, e.g., the MAC entity of the UE, may process and execute the second (later) received DCI scheduling PUSCH resources for high urgency/priority/reliability traffic, i.e., "preempting grant/DCI," and ignores the first received uplink grant, i.e., "preempted grant," for cases when the preempted grant is scheduling an initial new transmission, i.e., where the NDI is toggled. To be more specific, the MAC entity identifies the HARQ process associated with the preempting grant, generates a MAC PDU in accordance with the transport block size indicated in the grant (assuming that the preempting grant requests a new initial transmission), and stores the generated MAC PDU in the associated HARQ buffer. Here, the UE, e.g., the MAC entity of the UE, ignores the preempted uplink grant, i.e., it considers the preempted grant as not having been received.

One of the consequences of ignoring the preempted grant is, that the grant (even though received) is not stored for the corresponding HARQ process and that the NDI signaled within this grant is not used for a later NDI comparison, i.e., to determine whether an initial or retransmission is requested by gNB. One motivation to ignore the preempted grant, i.e., first received DCI, is that the UE might not be able to finish the generation of the Transport block respectively the channel coding/rate matching according to the first received DCI in addition to the generation/transmission of the high urgency TB due to processing time constraints.

According to another implementation of the first solution, the UE, e.g., the MAC entity of the UE, processes/executes the preempting grant and also processes the first received uplink grant, i.e., "preempted grant," for cases when the preempted grant is scheduling an initial new transmission, i.e., where the NDI is toggled. According to this implementation, the UE will still follow/process the preempted uplink grant but may interrupt the generation/processing of the transport block while executing/processing the preempting grant. The assumption is that UE has already started executing/processing the first received uplink grant, i.e., LCP has been already started, when the second DCI, i.e., the preempting grant, is received. The processing of the preempted grant may be resumed, e.g., finishing the generation of the MAC PDU and storing it in the corresponding HARQ buffer, once the generation of the high urgency/critical TB (with channel coding/rate matching etc.) is finished respectively when UE has sufficient processing resources available.

According to a further implementation of the first solution, the UE does not process/execute a received UL grant, e.g., start LCP procedure, until the point of time, i.e., slot or PDCCH occasion, where a potential preemption UL grant may occur. The latest timing, i.e., slot or PDCCH occasion, where a potential preemption DCI may occur before an allocated PUSCH resource may be configured or fixed, i.e., minimum processing time of the UE for a PUSCH transmission (e.g., as defined in section 6.4 of TS 38.214).

In various embodiments, the MAC entity is aware of a received DCI preempting an earlier scheduled PUSCH allocation in order to act according to above specified behavior, e.g., ignore the preempted grant if the UE did not start processing it (UE has not started with the formation of corresponding MAC TB) or interrupt processing the preempted grant and resume the processing at next available opportunity after having processed the preempting grant, etc. In various embodiments, the Physical layer indicates to the MAC entity whether the received grant is a high urgency respectively preemption DCI, e.g., in addition to the legacy grant information like TBS, NDI, numerology, RV etc. Therefore, according to a second solution for efficient uplink preemption, the DCI (uplink grant) explicitly indicates that this DCI is a high urgency/priority PUSCH allocation (potentially) preempting an earlier overlapping PUSCH allocation.

According to one implementation of the second solution, a new RNTI is defined which indicates that a DCI (uplink grant) addressed to this RNTI is a high urgency/priority DCI preempting a potential earlier overlapping PUSCH allocation. In a certain implementation the INT-RNTI indicating in legacy NR specifications a preemption in the DL, is used to indicate also an UL preemption. According to another implementation of the second embodiment one or more fields respectively codepoints of field(s) in the DCI are used to indicate high urgency/preemption. In one implementation the "UL-SCH indicator" field in the DCI, e.g., DCI format 0-1, in conjunction with the "CSI request" field is used to indicate a high urgency/preempting grant. A value of "0" for the UL-SCH indicator field with "CSI request" field set to all zero(s) indicates a high urgency/preemption DCI.

In an alternative implementation of the second solution, the SRS request field set to a predefined value/codepoint indicates a high urgency/preempting grant, i.e., no SRS transmission is to be performed by the UE in this case.

According to a third solution for efficient uplink preemption, the UE determines whether to use a configured grant allocation or dynamically scheduled UL resources for transmission of high urgency/critical data depending on at least one of the following criteria: packet size, code rate, modulation level, spectral efficiency, and power headroom.

In various embodiments, the UE considers data packet size when determining whether to use a configured grant allocation or dynamically scheduled UL resources for transmission of high urgency/critical data. If the high urgency data packet size fits only in dynamic scheduled UL resources the UE uses the dynamic scheduled UL resources. If the high urgency data packet size fits only in configured UL resources the UE uses the configured UL resources.

If the high urgency data packet size fits both in dynamic scheduled UL resources as well as in configured UL resources the UE determines the UL resource for transmission at least based on one of the following defined options: In a first option, the UE is configured which resource to use (or it is fixed by specification). According to a second option, the UE uses the resource where the resulting code rate is lower. According to a third option, the UE uses the resource where the modulation level is rate is lower and reverts to Option 2 if the modulation level is identical. According to a fourth option, the UE uses the resource where the resulting spectral efficiency is lower. According to a fifth option, the UE uses the resource where the resulting power headroom is larger.

If the high urgency data packet size fits neither in dynamic scheduled UL resources nor in configured UL resources, then the UE sends some "high urgency BSR" together with eMBB (or other non-high-urgency) data on the dynamically allocated UL resources indicating the size of the high urgency data. Here, the "high urgency BSR" indicates the size (amount) of the high urgency/critical data.

Figure 4:
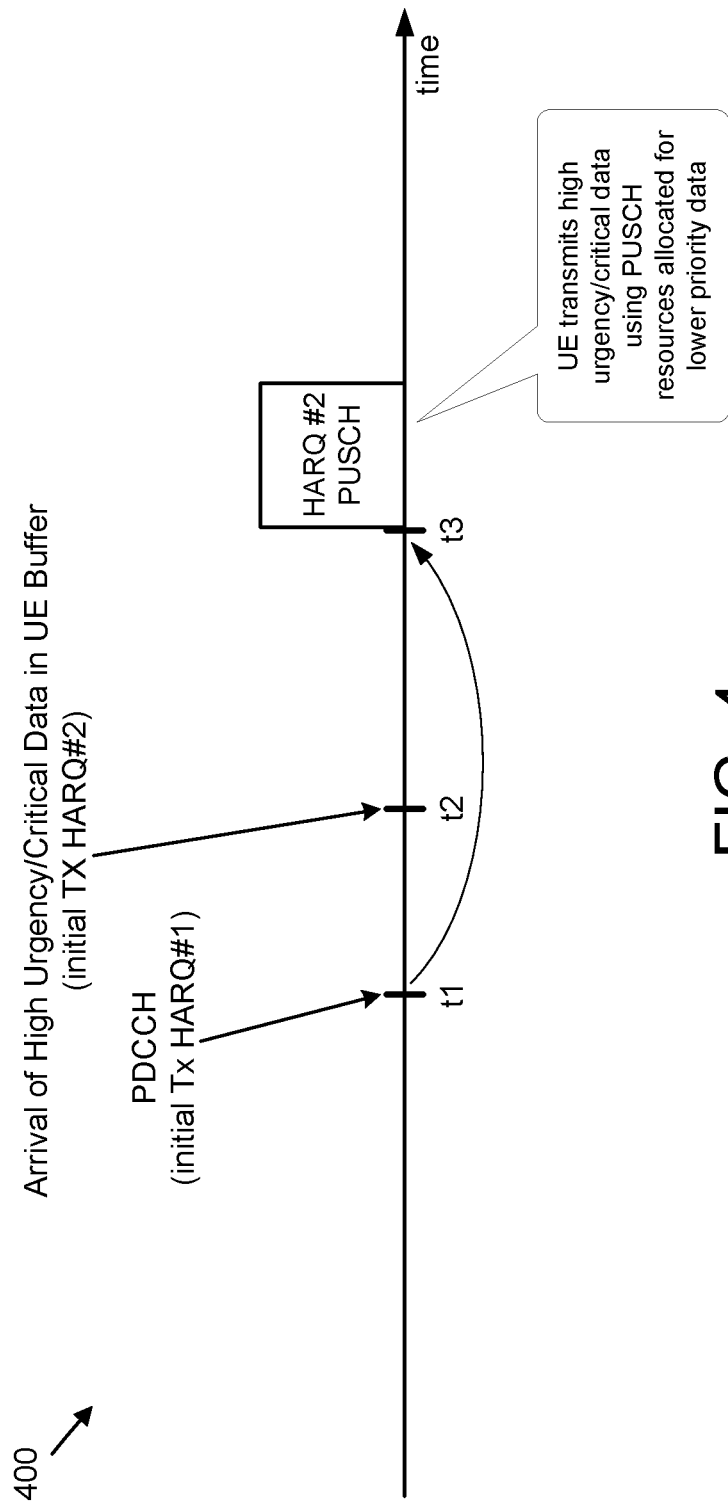
FIG. 4 is a diagram illustrating another embodiment of timing of uplink preemption.

FIG. 4 depicts a timing diagram for a UL preemption scenario 400, according to embodiments of the disclosure. The UL preemption scenario 400 may be implemented at a UE, such as the remote unit 105 and/or the UE 205. At time 't1', the UE receives an allocation of uplink resources (e.g., PUSCH resources) via PDCCH. In the embodiment of FIG. 4, it is assumed that the scheduled resources are for normal priority data and are associated with an initial transmission for a first HARQ process (HARQ #1). Here, the allocation of uplink resources may be a dynamic grant received via DCI. As depicted, the allocated uplink resources (PUSCH resources) begin at time 't3'.

At time 't2' (e.g., after receiving the allocation of uplink resources, but before time 't3') high urgency/critical data arrives in the UE's buffer. The arrival of the high urgency/critical data causes the UE to preempt the lower priority data and instead transmit the high urgency/critical data at time 't3' using the previously scheduled PUSCH resources.

According to a fourth solution, a UE may transmit high urgency/critical data on PUSCH resources allocated for lower priority data. There might be cases where a UE has been allocated PUSCH resources intended for low priority traffic like eMBB—those PUSCH resources might have been allocated by a DCI—when high urgency/critical data arrives in UEs buffer. It should be noted that the transmission parameters of the PUSCH resources, i.e., MCS, number of RBs, etc., scheduled by the DCI might not be suitable for the transmission of high urgency/critical data. The critical data may require a very reliable transmission, e.g., successful decoding should be possible without any HARQ retransmissions in order to meet the latency requirements.

According to one implementation of the fourth solution, a UE may use allocated PUSCH resources for the transmission of the critical/urgency data. In order to meet the reliability/QoS requirements of the critical data, the UE may use different uplink transmission parameters such as modulation scheme, coding rate, TB size, redundancy version etc. as the ones scheduled for the PUSCH (e.g., by the DCI). In order to facilitate decoding at the gNB and to avoid an increased blind decoding, when using different transmission parameters for the uplink transmission than the ones allocated by the scheduler the UE may include uplink control information (UCI) indicating the transmission parameter(s) used in the PUSCH transmission. Here, the inclusion of the UCI will be done at the PHY by e.g., rate matching. The position of the UCI within the PUSCH resources may be fixed. In certain embodiments, a gNB may detect the presence of UCI based on some CRC which is attached to the UCI. In certain embodiments, the UCI may be positioned at the start of the PUSCH resource, e.g., after upfront DM-RS in order to allow for a fast detection of the UCI at the gNB side. The modulation scheme used for the transmission of the UCI may be predefined/configured or fixed in the specification, e.g., QPSK is always used.

According to one implementation of the fourth solution, when adapting the transmission parameters, e.g., TBS, MCS, RV, etc., scheduled for a PUSCH resource the UE may also use different transmission power control parameters compared to the power control parameters UE would use for a PUSCH transmission according to the scheduling grant. The power control parameters, e.g., P0 or alpha, used for a high urgency/critical transmission may be different compared to the power control parameters used for a lower priority data transmission (eMBB). In a certain implementation the power control parameters for a high urgency/critical data transmission are predefined/configured or fixed in the specification.

According to another implementation of the fourth solution, the UE determines whether it is allowed to use the allocated (low priority) UL resources for the transmission of the high urgency/critical data based on certain criteria. According to one possible implementation, the UE is configured with a table indicating for different TB sizes the corresponding minimum required number of allocated Resource Blocks (RBs). For cases when the number of RBs of the allocated (low priority) PUSCH resource is larger than or equal to the minimum #RBs as given in the table for the TB size required for the high urgency data, the UE determines that it is allowed to transmit the critical/high urgency data on the allocated (low priority) PUSCH resource, i.e., with adapted transmission parameters and/or power control parameter. According to an alternative approach, the UE uses the modulation scheme scheduled for the allocated (low priority) PUSCH resource and calculates—based on the number of allocated RBs—the coding rate for the transmission of the high urgency/critical data. In case the calculated code rate is lower than a threshold, i.e., threshold may be either fixed or preconfigured, UE is to transmit the data on the dynamically allocated UL resources.

In case UE determines that it is not allowed to transmit the high urgency/critical data on the dynamically allocated UL resources, e.g., determined code rate is too high, or number of RBs too small, the UE may send a "critical data BSR" together with other non-critical data on the dynamically allocated UL resources. This new type of buffer status report ("BSR") indicates the size of the pending high urgency/critical data. A new BSR MAC CE format may be introduced for the critical data BSR, the new format being identified by a reserved logical channel ID.

In various embodiments, when UE is configured with uplink resources, i.e., by means of a configured grant, for high urgency/critical data there may be a resource conflict between the configured grant resources and additional dynamic UL allocations (intended for other lower priority data) in case they overlap in the time domain. If high urgency/critical data is available for transmission in the UE and UE has dynamically scheduled UL resources in addition to the configured UL resources, then UE behavior needs to be defined. According to the legacy NR Rel-15 specification configured grant allocations are always preempted/overridden by a dynamic grant (DCI/PDCCH).

Figure 5:
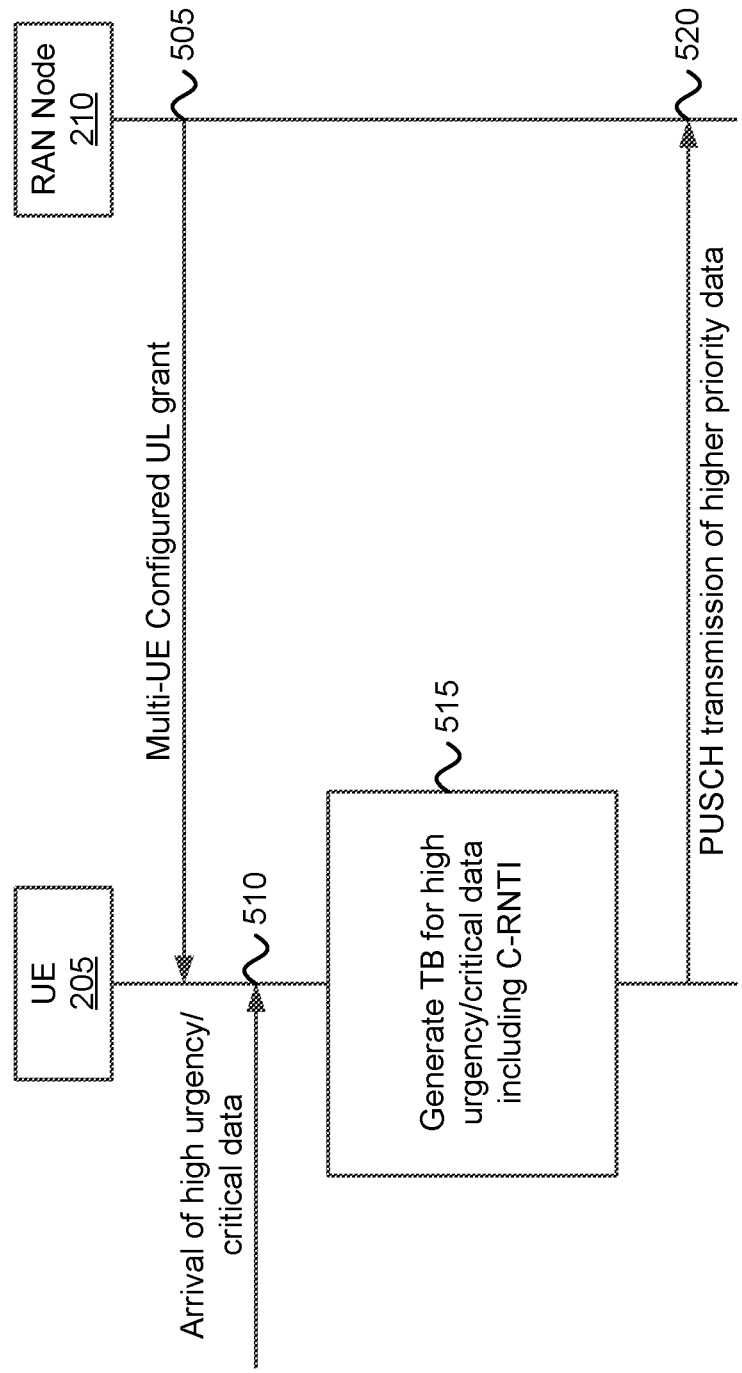
FIG. 5 is a diagram illustrating another embodiment of a network procedure for uplink preemption.

FIG. 5 depicts a network procedure 500 for uplink preemption, according to embodiments of the disclosure. The network procedure 500 involves the UE 205 and the RAN node 210. As depicted, the UE receives a configured UL grant 505 that is shared by multiple UEs served by the RAN node 210. At some time after receiving the configured UL grant 505, the UE 205 detects arrival of high urgency/critical data 510. The UE 205 generates a TB 515 with the high urgency/critical data that includes the C-RNTI. Additionally, the UE 205 sends a PUSCH transmission 520 of the higher priority data (e.g., the high urgency/critical data).

According to a fifth solution, a UE may transmit high urgency/critical data on PUSCH resources allocated semi-statically, e.g., by means of a configured grant, for high priority/critical data which are shared by several UEs. Whenever urgent/critical data arrives in the UE buffer, the UE uses those configured UL resources for the transmission of the critical data. Because the configured resources are not allocated in a dedicated manner for only one UE, but rather shared among a group of UEs, the UE includes an identifier, e.g., C-RNTI, in the PUSCH transmission in order to provide gNB with information on the UE identity.

Note that the transmission parameters of the PUSCH resources, i.e., MCS, number of RBs, etc., allocated by the configured grant may not be always suitable for the transmission of the high urgency/critical data, i.e., there may be different packet sizes. Therefore, the UE may use different uplink transmission parameters such as modulation scheme, coding rate, TB size, redundancy version etc. as the ones scheduled for the PUSCH (e.g., by the configured grant allocation). In order to facilitate decoding at the gNB and to avoid an increased blind decoding, the UE may include uplink control information (UCI) indicating the used transmission parameter in the PUSCH transmission as well as the UE identity (e.g. C-RNTI). The UCI may also contain the ID of the used HARQ process. The inclusion of the UCI will be done at the PHY by, e.g., rate matching. The position of the UCI within the PUSCH resources may be fixed. In one embodiment, a gNB may detect the presence of UCI based on some CRC. In certain embodiments, the UCI may be positioned at the start of the PUSCH resource (e.g., after upfront DM-RS) in order to allow for a fast detection of the UCI at the gNB side. The modulation scheme used for the transmission of the UCI may be predefined/configured or fixed in the specification, e.g., QPSK may always be used.

Figure 6:
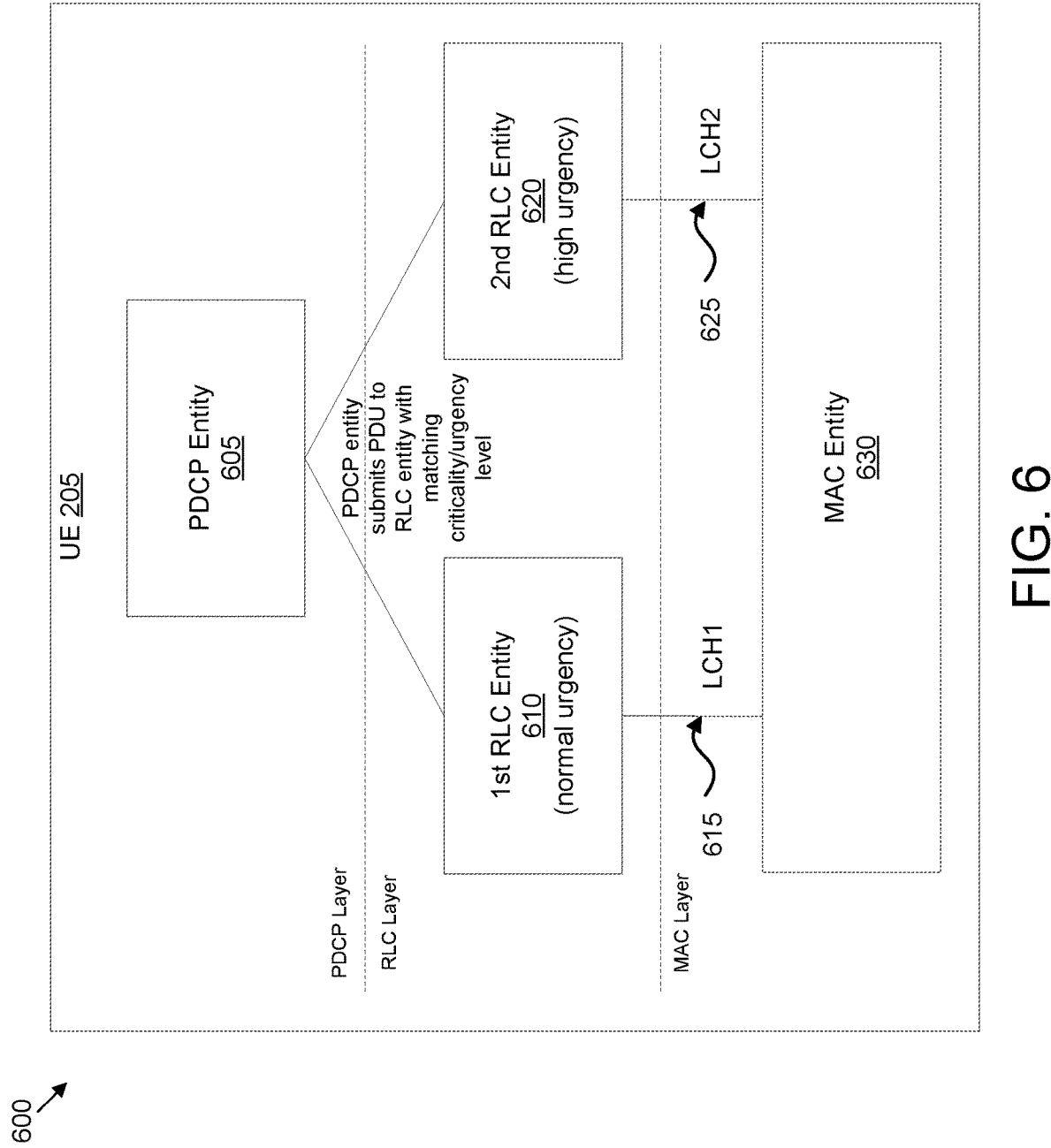
FIG. 6 is a diagram illustrating one embodiment of a UE protocol stack for uplink preemption.

FIG. 6 depicts a protocol stack 600 for use with UL preemption, according to embodiments of the disclosure. The protocol stack 600 may be implemented within a UE, such as the UE 205. The protocol stack 600 includes a PDCP entity 605 located at the PDCP layer. The PDCP entity 605 is mapped to multiple RLC entities, here the first RLC entity 610 (associated with a first Logical Channel 615) and a second RLC entity 620 (associated with a second Logical Channel 625). Here, the first RLC entity 610 is mapped to normal data and the second RLC entity 620 is mapped to high urgency data. In the depicted embodiment, each RLC entity 610, 620 is mapped to the same MAC entity 630.

According to a sixth solution for efficient uplink preemption, in the UE 205 one PDCP entity (e.g., the PDCP entity 605) may be mapped to multiple RLC entities/Logical channels in order to support packets of different priority/urgency level within one radio bearer or QoS flow. For example, an IIoT traffic flow may support critical packets, e.g. emergency stop packets, within a radio bearer or a QoS flow. Those critical packets are to be prioritized over other packets within the same radio bearer or the QoS flow. The PDCP entity in the UE receives the SDUs with a marking indicating if a particular SDU is considered critical/high urgency. Such packet marking may be done by a higher layer such as application layer or IP layer. The PDCP PDU containing such SDU will be submitted to another RLC entity (RLC entity other than the one used for "normal"

packets) handling such critical packets. If there are different levels of criticalness/urgency level then the PDCP PDU containing such SDU will be submitted to RLC entities handling the corresponding criticality/urgency level, e.g., one RLC entity/LCH supports one urgency level.

In order to enable efficient scheduling of uplink transmissions by having a closer match of uplink transmission parameters (including numerology, PUSCH transmission duration, MCS, etc.) for the PUSCH transmission to logical channel (LCH) requirements, an NR system may support an early indication to the gNB of the type of traffic on the logical channel(s) triggering the SR, through the use of multiple, single-bit SR configurations. An SR configuration may consist of a set of PUCCH resources for SR across different Bandwidth Parts (BWP) and serving cells. According to one implementation of the sixth solution, each LCH of a bearer supporting packets of different priority/urgency level (e.g., of a radio bearer having more than one associated LCHs/RLC entities) may be mapped to zero or one SR configuration. In other words, a radio bearer mapped to multiple LCHs may be mapped to more than one SR configuration. Each SR configuration indicates to the gNB the type of traffic on the logical channel(s) triggering the SR, i.e. certain priority/urgency level of the data.

Figure 7:
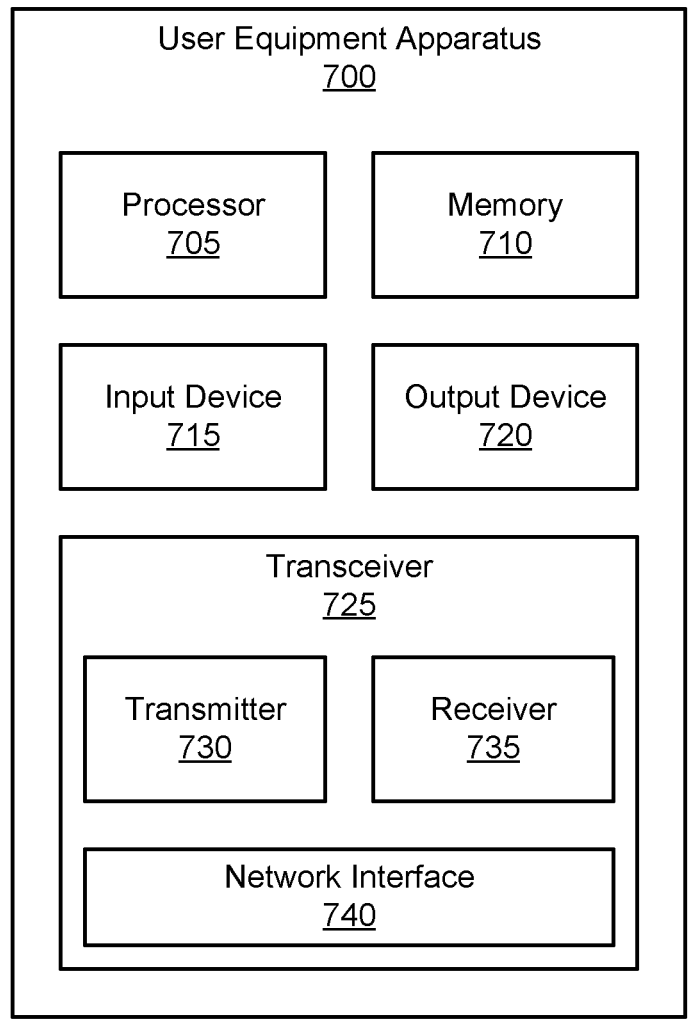
FIG. 7 is a schematic block diagram illustrating one embodiment of a user equipment apparatus that may be used for uplink preemption.

FIG. 7 depicts a user equipment apparatus 700 that may be used operation for uplink preemption, according to embodiments of the disclosure. The user equipment apparatus 700 may be one embodiment of the remote unit 105 or UE, described above. Furthermore, the user equipment apparatus 700 may include a processor 705, a memory 710, an input device 715, an output device 720, and a transceiver 725. In some embodiments, the input device 715 and the output device 720 are combined into a single device, such as a touchscreen. In certain embodiments, the user equipment apparatus 700 may not include any input device 715 and/or output device 720. In various embodiments, the user equipment apparatus 700 may include one or more of: the processor 705, the memory 710, and the transceiver 725, and may not include the input device 715 and/or the output device 720.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the user equipment apparatus 700 receives (e.g., via the transceiver 725) a first allocation of uplink resources in a mobile communication network and receives a second allocation of uplink resources in the mobile communication network. Here, the second allocation at least partially overlaps in time with the first allocation and the second allocation is received at a later time than the first allocation.

The processor 705 determines whether the second allocation is associated with higher priority traffic than the first allocation and preempts the first allocation to generate a TB according to the second allocation in response to the second allocation being associated with higher priority traffic than the first allocation.

In some embodiments, the second allocation is indicated using DCI, wherein the DCI includes a parameter indicating that the second allocation is a high priority allocation. Here, the first allocation may be a dynamic grant indicated using DCI or may be a configured grant. In certain embodiments, the parameter indicating a high priority allocation may be a particular RNTI. In certain embodiments, the parameter indicating a high priority allocation may be an SRS request field that is set to a predefined value. In certain embodiments, the parameter indicating a high priority allocation may be an UL-SCH indicator field that is set to a first predetermined value in conjunction with a CSI request field that is set to a second predetermined value.

In some embodiments, the processor 705 defers processing of the first allocation until a predetermined time before a transmission occasion corresponding to the uplink resources of the first allocation.

In some embodiments, preempting the first allocation to generate the TB according to the second allocation includes the processor 705 interrupting generation of a first TB corresponding to the first allocation to generate a second TB corresponding to the second allocation and resuming generation of the first TB in response to completing generation of the second TB.

In some embodiments, preempting the first allocation to generate the TB according to the second allocation includes the processor 705 determining whether the first allocation corresponds to an initial transmission of data or a retransmission of data, generating a retransmission TB according to the first allocation in response to the first allocation corresponding to a retransmission of data, and delivering the retransmission TB to a transmit buffer.

In one embodiment, preempting the first allocation to generate the TB according to the second allocation further includes the processor 705 ignoring the first allocation in response to the first allocation corresponding to an initial transmission of data. In certain embodiments, the retransmission TB and a TB corresponding to the second allocation belong to different HARQ processes. In certain embodiments, the first allocation is indicated using first DCI, and wherein determining whether the first allocation corresponds to an initial transmission of data or a retransmission of data includes examining an NDI field of the first DCI.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to preempting an uplink resource allocation. For example, the memory 710 may store data relating to configured grants, dynamic grants, priorities, and the like. In certain embodiments, the memory 710 also stores program code and related data, such as an operating system or other controller algorithms operating on the user equipment apparatus 700.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the user equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 communicates with one or more network functions of a mobile communication network via one or more access networks. The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. Although only one transmitter 730 and one receiver 735 are illustrated, the user equipment apparatus 700 may have any suitable number of transmitters 730 and receivers 735. Further, the transmitter(s) 730 and the receiver(s) 735 may be any suitable type of transmitters and receivers. In one embodiment, the transceiver 725 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 725, transmitters 730, and receivers 735 may be implemented as physically separate components that access a shared hardware resource and/or software resource, such as for example, the network interface 740.

In various embodiments, one or more transmitters 730 and/or one or more receivers 735 may be implemented and/or integrated into a single hardware component, such as a multi-transceiver chip, a system-on-a-chip, an ASIC, or other type of hardware component. In certain embodiments, one or more transmitters 730 and/or one or more receivers 735 may be implemented and/or integrated into a multi-chip module. In some embodiments, other components such as the network interface 740 or other hardware components/circuits may be integrated with any number of transmitters 730 and/or receivers 735 into a single chip. In such embodiment, the transmitters 730 and receivers 735 may be logically configured as a transceiver 725 that uses one more common control signals or as modular transmitters 730 and receivers 735 implemented in the same hardware chip or in a multi-chip module.

Figure 8:
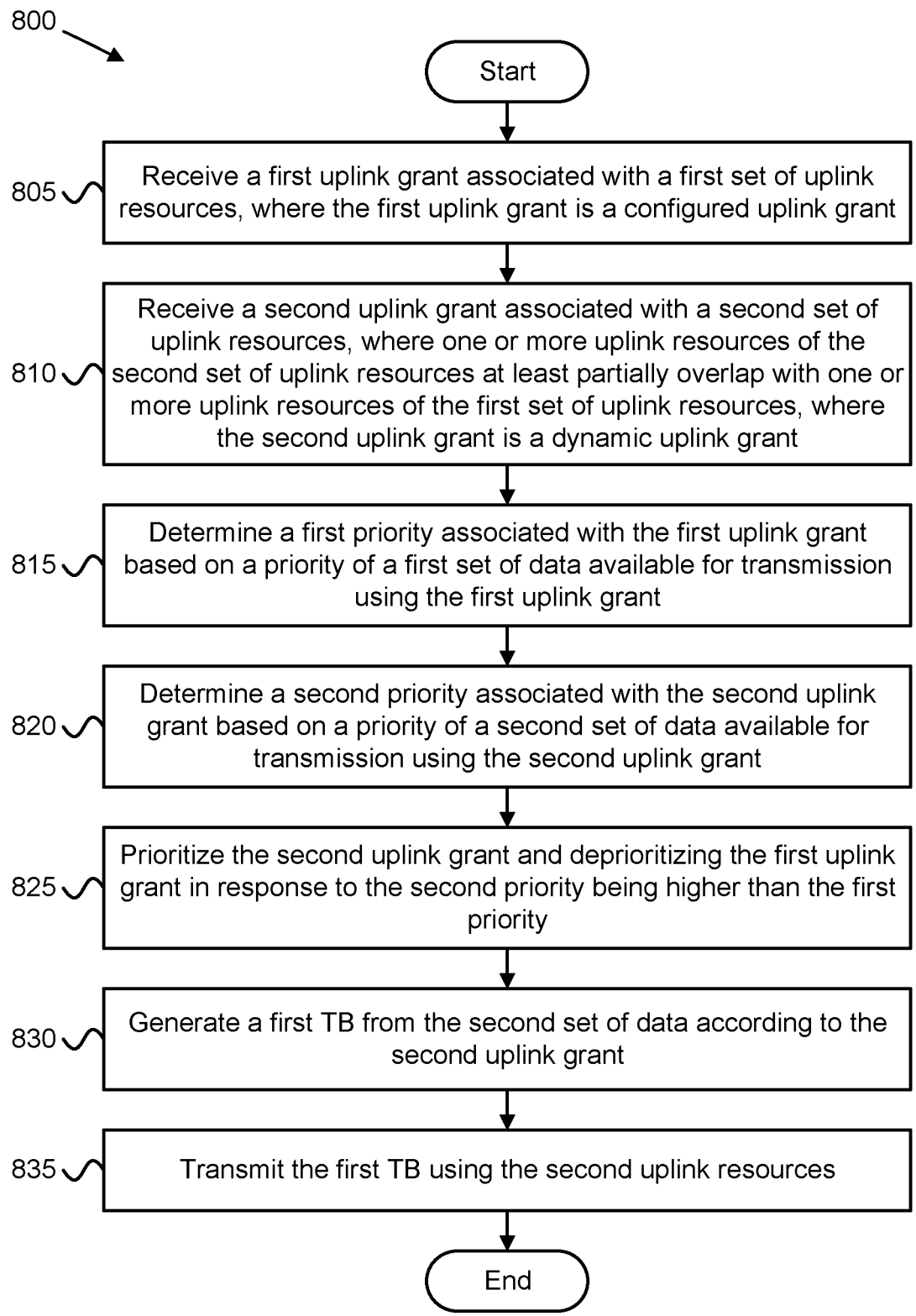
FIG. 8 is a block diagram illustrating one embodiment of a method for uplink preemption.

FIG. 8 depicts a method 800 for supporting edge data network discovery, according to embodiments of the disclosure. In some embodiments, the method 800 is performed by a UE, such as the remote unit 105, the UE 205, and/or the user equipment apparatus 700. In certain embodiments, the method 800 may be performed by a processor executing program code, for example, a microcontroller, a microprocessor, a CPU, a GPU, an auxiliary processing unit, a FPGA, or the like.

The method 800 begins and receives 805 a first uplink grant associated with a first set of uplink resources, where the first uplink grant is a configured uplink grant. The method 800 includes receiving 810 receiving a second uplink grant associated with a second set of uplink resources, where one or more uplink resources of the second set of uplink resources at least partially overlap with one or more uplink resources of the first set of uplink resources, where the second uplink grant is a dynamic uplink grant.

The method 800 includes determining 815 a first priority associated with the first uplink grant based on a priority of a first set of data available for transmission using the first uplink grant. The method 800 includes determining 820 a second priority associated with the second uplink grant based on a priority of a second set of data available for transmission using the second uplink grant.

The method 800 includes prioritizing 825 the second uplink grant and deprioritizing the first uplink grant in response to the second priority being higher than the first priority. The method 800 includes generating 830 a first TB from the second set of data according to the second uplink grant. The method 800 includes transmitting 835 the first TB using the second uplink resources. The method 800 ends.

Disclosed herein is a first apparatus for preempting an uplink resource allocation, according to embodiments of the disclosure. The first apparatus may be implemented by a UE, such as the remote unit 105, the UE 205, and/or the user equipment apparatus 700. The first apparatus includes a processor and a transceiver that receives a first allocation of uplink resources in a mobile communication network and receives a second allocation of uplink resources. Here, the second allocation is received at a later time than the first allocation, wherein the second allocation at least partially overlaps in time with the first allocation. The processor determines whether the second allocation is associated with higher priority traffic than the first allocation and preempts the first allocation to generate a TB according to the second allocation in response to the second allocation being associated with higher priority traffic than the first allocation.

In some embodiments, the second allocation is indicated using DCI, wherein the DCI includes a parameter indicating that the second allocation is a high priority allocation. In such certain, the parameter indicating that the second allocation is a high priority allocation may be a particular RNTI. In certain embodiments, the parameter indicating that the second allocation is a high priority allocation may be an SRS request field that is set to a predefined value. In certain embodiments, the parameter indicating that the second allocation is a high priority allocation may be an UL-SCH indicator field that is set to a first predetermined value in conjunction with a CSI request field that is set to a second predetermined value.

In some embodiments, the processor defers processing of the first allocation until a predetermined time before a transmission occasion corresponding to the uplink resources of the first allocation.

In some embodiments, preempting the first allocation to generate the TB according to the second allocation includes the processor interrupting generation of a first TB corresponding to the first allocation to generate a second TB corresponding to the second allocation and resuming generation of the first TB in response to completing generation of the second TB.

In some embodiments, preempting the first allocation to generate the TB according to the second allocation includes the processor determining whether the first allocation corresponds to an initial transmission of data or a retransmission of data, generating a retransmission TB according to the first allocation in response to the first allocation corresponding to a retransmission of data, and delivering the retransmission TB to a transmit buffer.

In one embodiment, preempting the first allocation to generate the TB according to the second allocation further includes ignoring the first allocation in response to the first allocation corresponding to an initial transmission of data. In certain embodiments, the retransmission TB and the TB corresponding to the second allocation belong to different HARQ processes. In certain embodiments, the first allocation is indicated using first DCI, and wherein determining whether the first allocation corresponds to an initial transmission of data or a retransmission of data includes examining an NDI field of the first DCI.

Disclosed herein is a first method for preempting an uplink resource allocation, according to embodiments of the disclosure. The first method may be performed by a UE, such as the remote unit 105, the UE 205, and/or the user equipment apparatus 700. The first method includes receiving a first allocation of uplink resources in a mobile communication network and receiving a second allocation of uplink resources. Here, the second allocation at least partially overlaps in time with the first allocation and the second allocation is received at a later time than the first allocation. The first method includes determining whether the second allocation is associated with higher priority traffic than the first allocation and preempting the first allocation to generate a TB according to the second allocation in response to the second allocation being associated with higher priority traffic than the first allocation.

In some embodiments, the second allocation is indicated using a DCI, wherein the DCI includes a parameter indicating that the second allocation is a high priority allocation. Here, the first allocation may be a dynamic grant indicated using DCI or may be a configured grant. In certain embodiments, the parameter indicating that the second allocation is a high priority allocation may include a particular Radio RNTI. In certain embodiments, the parameter indicating that the second allocation is a high priority allocation may include an SRS request field that is set to a predefined value. In certain embodiments the parameter indicating that the second allocation is a high priority allocation may include an UL-SCH indicator field that is set to a first predetermined value in conjunction with a CSI request field that is set to a second predetermined value.

In some embodiments, the first method includes deferring processing of the first allocation until a predetermined time before a transmission occasion corresponding to the uplink resources of the first allocation.

In some embodiments, preempting the first allocation to generate the TB according to the second allocation includes interrupting generation of a first TB corresponding to the first allocation to generate a second TB corresponding to the second allocation and resuming generation of the first TB in response to completing generation of the second TB.

In some embodiments, preempting the first allocation to generate the TB according to the second allocation includes: determining whether the first allocation corresponds to an initial transmission of data or a retransmission of data, generating a retransmission TB according to the first allocation in response to the first allocation corresponding to a retransmission of data, and delivering the retransmission TB to a transmit buffer.

In such embodiments, preempting the first allocation to generate the TB according to the second allocation further includes ignoring the first allocation in response to the first allocation corresponding to an initial transmission of data. In certain embodiments, the retransmission TB and the TB corresponding to the second allocation belong to different HARQ processes. In certain embodiments, the first allocation is indicated using first DCI, and wherein determining whether the first allocation corresponds to an initial transmission of data or a retransmission of data includes examining an NDI field of the first DCI.

Disclosed herein is a first apparatus for preempting an uplink resource allocation, according to embodiments of the disclosure. The first apparatus may be implemented by a UE, such as the remote unit 105, the UE 205, and/or the user equipment apparatus 700. The first apparatus includes a transceiver and a processor coupled with the transceiver, the processor configured to receive a first uplink grant associated with a first set of uplink resources and to receive a second uplink grant associated with a second set of uplink resources, where the first uplink grant is a configured uplink grant and where the second uplink grant is a dynamic uplink grant.

The processor determines a first priority associated with the first uplink grant based on a priority of a first set of data available for transmission using the first uplink grant and determines a second priority associated with the second uplink grant based on a priority of a second set of data available for transmission using the second uplink grant. The processor prioritizes the second uplink grant and deprioritizing the first uplink grant in response to the second priority being higher than the first priority and generates a first TB from the second set of data according to the second uplink grant. Via the transceiver, the processor transmits the first TB using the second uplink resources.

In some embodiments, the processor further: A) identifies the first set of data available for transmission using the first uplink grant, the first set of data being stored in a buffer of the UE; and B) identifies the second set of data available for transmission using the second uplink grant, the second set of data being stored in the buffer. In certain embodiments, identifying the first set of data comprises performing a logical channel prioritization procedure to map the first set of data to the first uplink grant, and wherein identifying the second set of data comprises performing a logical channel prioritization procedure to map the second set of data to the second uplink grant.

In some embodiments, the second allocation is indicated using DCI. In some embodiments, the processor further defers processing of the first allocation until a predetermined time before a transmission occasion corresponding to the uplink resources of the first allocation.

In some embodiments, deprioritizing the first allocation includes: A) interrupting generation of a second TB corresponding to the first allocation to generate the first TB; and B) resuming generation of the second TB in response to completing generation of the first TB.

In some embodiments, deprioritizing the first allocation includes: A) determining whether the first allocation corresponds to an initial transmission of data or a retransmission of data; B) generating a retransmission TB according to the first allocation in response to the first allocation corresponding to a retransmission of data; and C) delivering the retransmission TB to a transmit buffer.

In certain embodiments, deprioritizing the first allocation further comprises ignoring the first allocation in response to the first allocation corresponding to an initial transmission of data. In certain embodiments, the retransmission TB and the TB corresponding to the second allocation belong to different HARQ processes. In certain embodiments, the first allocation is indicated using first DCI, and wherein determining whether the first allocation corresponds to an initial transmission of data or a retransmission of data comprises examining a NDI field of the first DCI.

Disclosed herein is a second method for preempting an uplink resource allocation, according to embodiments of the disclosure. The second method may be performed by a UE, such as the remote unit 105, the UE 205, and/or the user equipment apparatus 700. The second method includes receiving a first uplink grant associated with a first set of uplink resources and receiving a second uplink grant associated with a second set of uplink resources, where the first uplink grant is a configured uplink grant and where one or more uplink resources of the second set of uplink resources at least partially overlap with one or more uplink resources of the first set of uplink resources, where the second uplink grant is a dynamic uplink grant.

The second method includes determining a first priority associated with the first uplink grant based on a priority of a first set of data available for transmission using the first uplink grant and determining a second priority associated with the second uplink grant based on a priority of a second set of data available for transmission using the second uplink grant. The second method includes prioritizing the second uplink grant in response to the second priority being higher than the first priority and deprioritizing the first uplink grant in response to the second priority being higher than the first priority. The second method includes generating a first TB from the second set of data according to the second uplink grant and transmitting the first TB using the second uplink resources.

In some embodiments, the second method further includes: A) identifying the first set of data available for transmission using the first uplink grant, the first set of data being stored in a buffer of the UE; and B) identifying the second set of data available for transmission using the second uplink grant, the second set of data being stored in the buffer. In certain embodiments, identifying the first set of data comprises performing a logical channel prioritization procedure to map the first set of data to the first uplink grant, and wherein identifying the second set of data comprises performing a logical channel prioritization procedure to map the second set of data to the second uplink grant.

In some embodiments, the second allocation is indicated using DCI. In some embodiments, the second method further includes deferring processing of the first allocation until a predetermined time before a transmission occasion corresponding to the uplink resources of the first allocation.

In some embodiments, deprioritizing the first allocation includes: A) interrupting generation of a second TB corresponding to the first allocation to generate the first TB; and B) resuming generation of the second TB in response to completing generation of the first TB.

In some embodiments, deprioritizing the first allocation includes: A) determining whether the first allocation corresponds to an initial transmission of data or a retransmission of data; B) generating a retransmission TB according to the first allocation in response to the first allocation corresponding to a retransmission of data; and C) delivering the retransmission TB to a transmit buffer.

In certain embodiments, deprioritizing the first allocation further comprises ignoring the first allocation in response to the first allocation corresponding to an initial transmission of data. In certain embodiments, the retransmission TB and the TB corresponding to the second allocation belong to different HARQ processes. In certain embodiments, the first allocation is indicated using first DCI, and wherein determining whether the first allocation corresponds to an initial transmission of data or a retransmission of data comprises examining a NDI field of the first DCI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") for wireless communication, comprising:
   at least one memory; and
   at least one processor coupled with the at least one memory and configured to cause the UE to:
   receive a first uplink grant associated with a first set of uplink resources, wherein the first uplink grant is a configured uplink grant;
   receive a second uplink grant associated with a second set of uplink resources, wherein one or more uplink resources of the second set of uplink resources at least partially overlap with one or more uplink resources of the first set of uplink resources, wherein the second uplink grant is a dynamic uplink grant;
   determine a first priority associated with the first uplink grant based on a first set of data available for transmission using the first uplink grant; determine a second priority associated with the second uplink grant based on a second set of data available for transmission using the second uplink grant,
   prioritize the second uplink grant and deprioritizing the first uplink grant in response to the second priority being higher than the first priority;
   generate a first transport block ("TB") based on the second uplink grant; and
   transmit the first TB using the second set of uplink resources.

2. The UE of claim 1, wherein the at least one processor is further configured to cause the UE to:
identify the first set of data available for transmission using the first uplink grant, the first set of data being stored in a buffer of the UE; and
identify the second set of data available for transmission using the second uplink grant, the second set of data being stored in the buffer.

3. The UE of claim 2, wherein, to identify the first set of data, the at least one processor is configured to cause the UE to perform a logical channel prioritization procedure to map the first set of data to the first uplink grant, and wherein, to identify the second set of data, the at least one processor is configured to cause the UE to perform the logical channel prioritization procedure to map the second set of data to the second uplink grant.

4. The UE of claim 1, wherein the second uplink grant is indicated using downlink control information ("DCI").

5. The UE of claim 1, wherein the at least one processor is further configured to cause the UE to defer processing of the first uplink grant until a predetermined time before a transmission occasion corresponding to the first set of uplink resources of the first uplink grant.

6. The UE of claim 1, wherein, to deprioritize the first uplink grant, the at least one processor is configured to cause the UE to:
interrupt generation of a second TB corresponding to the first uplink grant to generate the first TB; and
resume generation of the second TB in response to completing generation of the first TB.

7. The UE of claim 1, wherein, to deprioritize the first uplink grant, the at least one processor is configured to cause the UE to:
determine whether the first uplink grant corresponds to an initial transmission of data or a retransmission of data;
generate a retransmission TB according to the first uplink grant in response to the first uplink grant corresponding to a retransmission of data; and
deliver the retransmission TB to a transmit buffer.

8. The UE of claim 7, wherein, to deprioritize the first uplink grant, the at least one processor is configured to cause the UE to ignore the first uplink grant in response to the first uplink grant corresponding to an initial transmission of data.

9. The UE of claim 7, wherein the retransmission TB and the first TB corresponding to the second uplink grant belong to different hybrid automatic repeat request ("HARQ") processes.

10. The UE of claim 7, wherein the first uplink grant is indicated using first downlink control information ("DCI"), and wherein to determine whether the first uplink grant corresponds to an initial transmission of data or a retransmission of data, the at least one processor is configured to cause the UE to examine a new data indicator ("NDP") field of the first DCI.

11. A processor for wireless communication, comprising:
at least one controller coupled with at least one memory and configured to cause the processor to:
receive a first uplink grant associated with a first set of uplink resources, wherein the first uplink grant is a configured uplink grant;
receive a second uplink grant associated with a second set of uplink resources, wherein one or more uplink resources of the second set of uplink resources at least partially overlap with one or more uplink resources of the first set of uplink resources, wherein the second uplink grant is a dynamic uplink grant;
determine a first priority associated with the first uplink grant based on a first set of data available for transmission using the first uplink grant;
determine a second priority associated with the second uplink grant based on a second set of data available for transmission using the second uplink grant;
prioritize the second uplink grant and deprioritizing the first uplink grant in response to the second priority being higher than the first priority;
generate a first transport block ("TB") based on the second uplink grant; and
transmit the first TB using the second set of uplink resources.

12. The processor of claim 11, wherein the at least one controller is further configured to cause the processor to:
identify the first set of data available for transmission using the first uplink grant, the first set of data being stored in a buffer; and
identify the second set of data available for transmission using the second uplink grant, the second set of data being stored in the buffer.

13. The processor of claim 12, wherein, to identify the first set of data the at least one controller is configured to cause the processor to perform a logical channel prioritization procedure to map the first set of data to the first uplink grant, and wherein, to identify the second set of data the at least one controller is configured to cause the processor to perform the logical channel prioritization procedure to map the second set of data to the second uplink grant.

14. The processor of claim 11, wherein the second uplink grant is indicated using downlink control information ("DCI").

15. The processor of claim 11, wherein the at least one controller is further configured to cause the processor to defer processing of the first uplink grant until a predetermined time before a transmission occasion corresponding to the first set of uplink resources of the first uplink grant.

16. The processor of claim 11, wherein, to deprioritize the first uplink grant the at least one controller is configured to cause the processor to:
interrupt generation of a second TB corresponding to the first uplink grant to generate the first TB; and
resume generation of the second TB in response to completing generation of the first TB.

17. The processor of claim 11, wherein, to deprioritize the first uplink grant the at least one controller is configured to cause the processor to:
determine whether the first uplink grant corresponds to an initial transmission of data or a retransmission of data;
generate a retransmission TB according to the first uplink grant in response to the first uplink grant corresponding to a retransmission of data; and
deliver the retransmission TB to a transmit buffer.

18. The processor of claim 17, wherein the first uplink grant is indicated using first downlink control information ("DCI"), wherein determining whether the first uplink grant corresponds to an initial transmission of data or a retransmission of data comprises examining a new data indicator ("NDP") field of the first DCI, and wherein, to deprioritize the first uplink grant the at least one controller is further configured to cause the processor to ignore the first uplink grant in response to the first uplink grant corresponding to an initial transmission of data.

19. The processor of claim 17, wherein the retransmission TB and the first TB corresponding to the second uplink grant belong to different hybrid automatic repeat request ("HARQ") processes.

20. A method performed by a user equipment ("UE"), the method comprising:
- receiving a first uplink grant associated with a first set of uplink resources, wherein the first uplink grant is a configured uplink grant;
- receiving a second uplink grant associated with a second set of uplink resources, wherein one or more uplink resources of the second set of uplink resources at least partially overlap with one or more uplink resources of the first set of uplink resources, wherein the second uplink grant is a dynamic uplink grant;
- determining a first priority associated with the first uplink grant based on a first set of data available for transmission using the first uplink grant;
- determining a second priority associated with the second uplink grant based on a second set of data available for transmission using the second uplink grant;
- prioritizing the second uplink grant and deprioritizing the first uplink grant in response to the second priority being higher than the first priority;
- generating a first transport block ("TB") based on the second uplink grant; and
- transmitting the first TB using the second set of uplink resources.

* * * * *